(12) United States Patent
Huang et al.

(10) Patent No.: US 7,363,806 B2
(45) Date of Patent: Apr. 29, 2008

(54) TIRE PARAMETER MONITORING SYSTEM WITH INDUCTIVE POWER SOURCE

(75) Inventors: Su Shiong Huang, Belleville, WA (US); Shengbo Zhu, San Jose, CA (US)

(73) Assignee: Silicon Valley Micro C Corp., San Jose, CA (US)

( * ) Notice: Subject to any disclaimer, the term of this patent is extended or adjusted under 35 U.S.C. 154(b) by 0 days.

(21) Appl. No.: 11/473,278

(22) Filed: Jun. 22, 2006

(65) Prior Publication Data

US 2007/0295070 A1    Dec. 27, 2007

(51) Int. Cl.
*G01M 17/02* (2006.01)
(52) U.S. Cl. .......................................................... 73/146
(58) Field of Classification Search .......... 73/700–756; 340/442–447
See application file for complete search history.

(56) References Cited

U.S. PATENT DOCUMENTS

| | | | |
|---|---|---|---|
| 6,748,797 B2 * | 6/2004 | Breed et al. ................... | 73/146 |
| 6,911,904 B2 * | 6/2005 | Nantz et al. ................ | 340/448 |
| 6,938,468 B1 * | 9/2005 | Lin et al. .................... | 73/146.5 |
| 7,145,446 B2 * | 12/2006 | Katou ......................... | 340/448 |
| 7,150,187 B2 * | 12/2006 | Caretta ........................ | 73/146 |

* cited by examiner

*Primary Examiner*—Andre J. Allen
*Assistant Examiner*—Jermaine Jenkins (57) ABSTRACT

A battery-less tire parameter sensor system for monitoring a vehicle tire parameter such as pressure and temperature. A sensor assembly has a power system, a processor/transmitter, a sensor, and a power coil mounted on a substrate. This assembly is mounted on or in the side wall or tread wall of a tire. A magnet is mounted on the vehicle in proximity to the path of the power coil during tire rotation. The moving power coil passes through the magnetic field and generates operating voltage for the sensor assembly components. The power system includes a voltage multiplier, a voltage regulator, and a storage capacitor. Two or more sensor assemblies can be mounted on the same tire to monitor different parameters.

23 Claims, 8 Drawing Sheets

TIRE PARAMETER MONITORING SYSTEM WITH INDUCTIVE POWER SOURCE

BACKGROUND OF THE INVENTION

This invention relates to automotive tire parameter monitoring systems. More particularly, this invention relates to a tire parameter monitoring system powered by inductively generated D.C. electrical power.

Tire parameter monitoring systems are known and are commonly used to monitor one or more parameters of interest in individual pneumatic tires of a vehicle and to provide an advisory signal to the driver, or an on-board computer system, whenever the monitored parameter in one or more of the vehicle tires reaches a value lying outside of a predetermined safe range. The parameter is typically internal tire pressure, tire temperature, internal tire air temperature, lateral tire force, or some other parameter of interest. The advisory signal is typically generated by an r.f. signal generator controlled by a microprocessor connected to the tire parameter sensor, the advisory signal being generated whenever the tire parameter measured by the sensor lies outside a predetermined normal operating range, signifying either a high or a low parameter condition. This r.f. signal is transmitted to a vehicle-mounted receiver, which uses the advisory signal to alert the driver either visually (by activating a warning lamp or display) or audibly (by activating an audible alarm) or both. Electrical power to the sensor circuitry is usually provided by a battery, which must be replaced (if possible) when the available battery power drops below a useful level. In some known systems, the battery cannot be replaced so that the entire sensor assembly must be replaced when the battery has reached the end of its useful lifetime.

A tire parameter sensor system which monitors internal tire pressure is disclosed in commonly assigned, co-pending patent application Ser. No. 10/346,490 filed Jan. 21, 2003 for "External Mount Tire Pressure Sensor System" (the '490 application), the disclosure of which is hereby incorporated by reference. This system uses a mechanical strain sensor having an essentially linear variable resistance characteristic in one branch of an electrical bridge circuit to measure the internal pressure of a tire to which the sensor is attached. This type of sensor is relatively insensitive to mechanical vibrations, which are regularly encountered in an automotive environment. In addition, the configuration of the electrical circuitry (i.e., the electrical bridge circuit) is relatively simple, has well-known performance characteristics, and has been found to be reasonably reliable in operation. However, the useful lifetime of this sensor system is limited by the energy capacity of the battery used to electrically power the system. More particularly, since the sensor circuitry is continuously powered by the essential battery when the vehicle electrical system is activated, the useful lifetime of the battery is limited by the battery energy capacity and the total activation time. This drawback is compounded by the need for components having relatively small physical size due to installation constraints. As a consequence, the size of the battery is severely limited, and battery replacement is a major constraint to the installed efficacy of such known sensor systems.

Commonly assigned, co-pending patent application Ser. No. 11/267,775 filed Nov. 4, 2005 for "Tire Pressure Sensor System With Improved Sensitivity And Power Saving", the disclosure of which is hereby incorporated by reference, discloses a tire pressure monitoring system which incorporates a power saving unit providing extended useful battery life. The power saving unit limits the application of electrical power from a battery to the system in a manner related to tire speed so that power is only applied, and thus drawn from the battery, for a measurement period related to tire speed after the tire speed has reached a threshold speed value. Preferably, this measurement period is related to the time required for a tire of a given size to complete a preselected number of revolutions. Since battery power is not continuously applied to the system, the useful lifetime of the battery is extended beyond that of the same type of battery used in a tire parameter monitoring system in which the battery is continuously electrically connected to the system components.

While the power saving unit described above does provide a substantial improvement in the useful lifetime of the system battery, and thus the overall system, all batteries have a finite energy capacity and eventually will be depleted. Once depleted, the battery must be replaced, if possible. If the battery cannot be replaced due to the design of the system, a new system must be installed.

Battery powered tire parameter monitoring systems also suffer from further disadvantages. First, the cost of the battery relative to the other system components is relatively high. The cost of a high quality lithium battery, for example, is approximately one-half the cost of the entire sensor assembly. In addition, the battery adds appreciable weight to the system: essentially fifty percent of the system weight is due to the battery.

Efforts have been made to design fire parameter sensor systems which eliminate the need for a battery to supply electrical power to the system components which require such power. One such design is shown in U.S. Patent Application Publication No. US 2004/0244474 A1 published Dec. 9, 2004, the disclosure of which is hereby incorporated by reference. This design utilizes a specially designed hub assembly at each wheel, the hub assembly having a stator element and a rotor element with permanent magnets and coils for electromagnetically generating an A.C. supply voltage for the sensor elements located on or in the wheel. While effective in eliminating the battery, this design requires that each wheel be provided with the special hub assembly, which adds substantial expense to the sensor system and requires substantial technical expertise to install on the vehicle.

Figure 1:
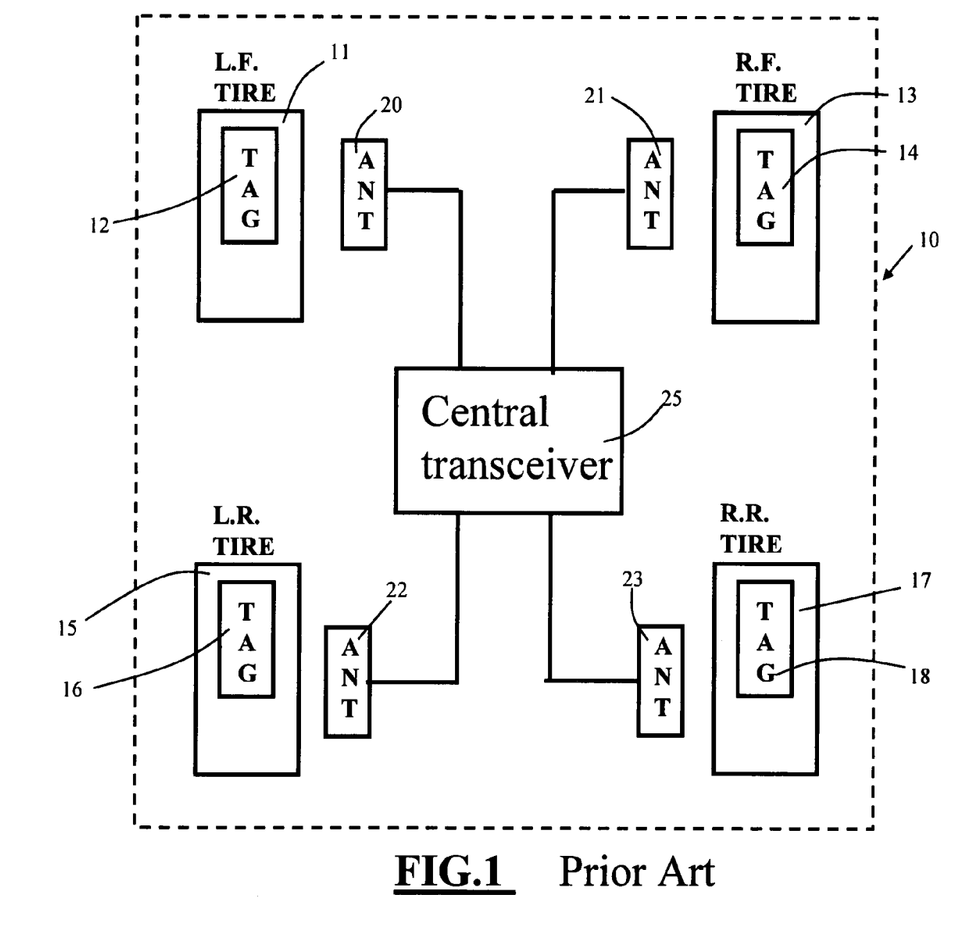
FIG. 1 is a schematic view of a prior art tire parameter monitor system using passive RFID tags and electro-magnetic energy coupling from individual antennae to supply power to each tag.

Another approach to designing a tire parameter sensor system devoid of a battery is illustrated in FIG. 1, which shows a known system 10 using RFID tags configured as passive transponders. As seen in this FIG., each tire of a vehicle has an associated RFID tag attached thereto. Thus, left front (L.F.) tire 11 has a tag 12; right front (R.F.) tire 13 has a tag 14; left rear (L.R.) fire 15 has a tag 16; and right rear (R.R.) tire 17 has a tag 18. Each tag 12, 14, 16, 18 has a small antenna (typically a dipole antenna-not shown) for enabling the electro-magnetic transfer of power into the tag. Positioned closely adjacent each tag 12, 14, 16, 18 is an associated antenna 20, 21, 22, 23. Each antenna 20, 21, 22, 23 is connected to a central transceiver 25, which controls system operation. Each tag 12, 14, 16, 18 is configured as a passive transponder, which derives its electrical operating power from electromagnetic energy received from the associated antenna when that antenna is activated by the central transceiver 25. While this system design eliminates the need for a separate battery for each tag 12, 14, 16, 18, it suffers from two major disadvantages. First, each antenna must be positioned closely adjacent the corresponding tag due to the relatively short effective energy transfer range inherent in an RFID tag system. This requirement imposes a severe constraint on the antenna locations, which must be precisely positioned with respect to the dipole antenna carried by the tags. Second, electrical cabling must be routed between the central transceiver 25 and the individual antennae 20, 21, 22, 23. This imposes a requirement of careful routing of the cables to avoid mechanical abrasion, electrical interference, and thermal stresses over time.

Efforts to provide a battery-less tire parameter sensor system devoid of the above-noted disadvantages have not been successful to date.

SUMMARY OF THE INVENTION

The invention comprises a method and system for monitoring vehicle tire parameters which eliminates the need for a battery power source, and which is relatively simple and inexpensive to implement.

In a broadest aspect, the invention comprises a tire parameter sensor assembly for monitoring a parameter of a vehicle tire, the assembly including a substrate; a power system carried by the substrate for converting an unregulated input voltage to a regulated output voltage, the power system having first and second input terminals; a tire parameter sensor carried by the substrate for providing monitoring signals representative of the value of the parameter; a processor/transmitter unit carried by the substrate and coupled to the sensor for converting the monitoring signals to transmission signals, the processor/transmitter unit having a power input terminal coupled to the output terminal of the power system; and a power coil carried by the substrate having a pair of terminals each connected to a different one of the first and second input terminals of the power system.

The power coil is preferably located on the substrate in a position surrounding the power system, the tire parameter sensor and the processor/transmitter unit in order to maximize the coil area and the potential number of coil turns.

The power system includes a voltage multiplier circuit, preferably a Cockcroft-Walton voltage multiplier circuit, having the power system input terminal and an output, a voltage regulator having an input coupled to the output of the voltage multiplier circuit and an output, and a storage capacitor coupled to the output of the voltage regulator.

The sensor assembly is mounted on a tire in several alternate ways: by adhering or otherwise securely bonding the substrate to the inner or outer surface of a side wall of the tire or the tread wall of the tire; by incorporating the sensor assembly into the interior of the side wall structure during fabrication of the tire; or by incorporating the sensor assembly into the interior of the tread wall structure during fabrication of the tire.

A magnet is mounted to a support member on the vehicle in a location wherein the magnetic field lines generated by the magnet extend toward the sensor assembly region when the tire is rotatably mounted on the vehicle.

In operation, when the tire rotates, the power coil passes through the magnetic field generated by the magnet and the unregulated input voltage is induced in the power coil. This unregulated input voltage is developed by the power system into the regulated output voltage, which supplies regulated D.C power to the processor/transmitter unit to render it operable.

Each vehicle tire is ordinarily provided with at least one sensor assembly; and a corresponding number of magnets is attached to support members on the vehicle to provide the magnetic fields required to induce the unregulated voltage in the power coils of the sensor assemblies. Two or more sensor assemblies can be mounted on a single tire to provide monitoring of two or more different tire parameters. The assemblies can be arranged to share the same single magnet, or a plurality of magnets may be installed, each dedicated to a different sensor assembly.

The invention provides a convenient solution to the problem of providing an inexhaustible power source for supplying electrical power to tire parameter monitoring systems in wheeled vehicles. The system can be installed on a vehicle either during manufacture of a new vehicle or as an aftermarket item. Further, existing vehicles without tire parameter monitoring systems can easily be retrofitted with a state-of-the-art system at relatively low cost. This is particularly beneficial in jurisdictions which mandate certain tire parameter monitoring devices on all road vehicles. The sensor assembly is substantially lighter in weight than known assemblies requiring a battery to power the electronics. In addition, the useful lifetime of a sensor assembly fabricated according to the invention is only limited by the operational lifetime of the electronic components and the useful lifetime of the tire, which are substantially longer than the lifetime of a battery. Two or more sensor assemblies can be installed on the same tire to measure different tire parameters, such as internal tire pressure, tire wall temperature, internal air temperature, and the like. Lastly, due to their light weight and low cost, the sensor assemblies can be incorporated into the tire during the tire fabrication process so that the sensor assemblies are replenished when a new tire is installed on a vehicle.

For a fuller understanding of the nature and advantages of the invention, reference should be made to the ensuing detailed description taken in conjunction with the accompanying drawings.

DETAILED DESCRIPTION OF THE PREFERRED EMBODIMENTS

Turning now to the drawings, FIG. 1 is a schematic view of the above-described prior art tire parameter monitor system using RFID tags configured as passive transponders and electrical operating power derived from electromagnetic energy received from associated antennae when activated by the central transceiver 25. The limitations and disadvantages of the FIG. 1 system are set forth above.

Figure 2:
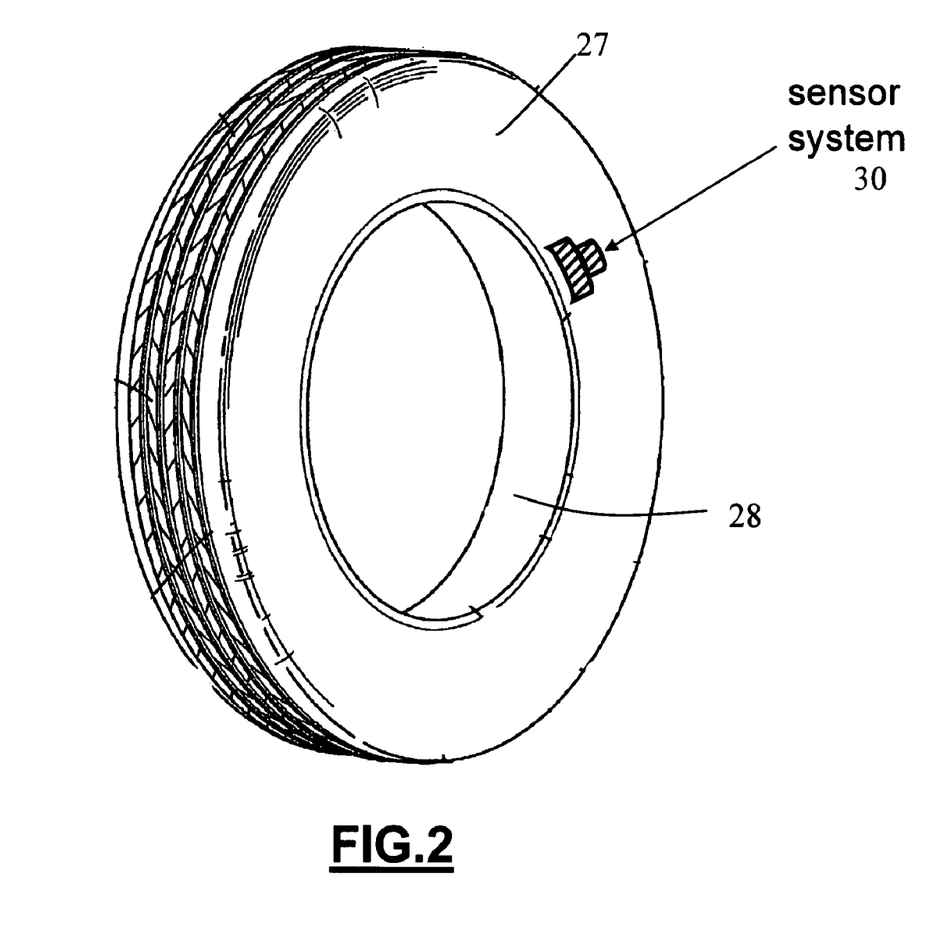
FIG. 2 is a perspective view of a single wheel and tire showing a tire parameter sensor mounted on the side wall surface of the tire.

FIG. 2 is a perspective view of a single wheel and tire showing a tire parameter sensor mounted on the side wall surface of the tire. As seen in this FIG., a vehicle tire 27 is mounted on a wheel 28. Mounted on the side wall of tire 27 is a tire parameter sensor assembly 30 illustrated in detail in FIGS. 3-5.

Figure 3:
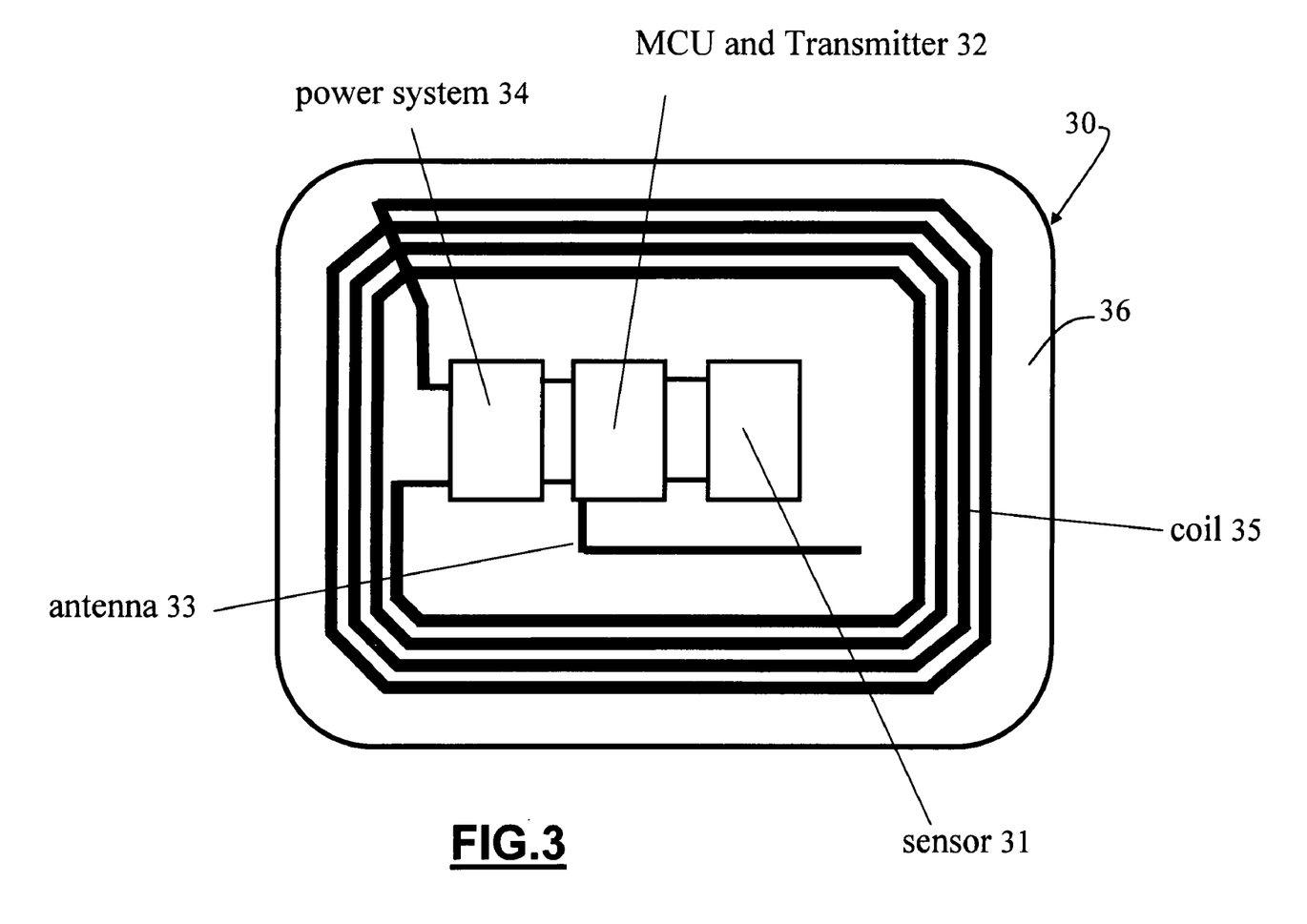
FIG. 3 is a top plan view showing a tire parameter sensor assembly according to the invention.

FIG. 3 is a top plan view showing tire parameter sensor assembly 30 according to the invention. As seen in this FIG., sensor assembly 30 includes a tire parameter sensor 31, a combination microcomputer unit/transmitter 32 (MCU/transmitter 32), an antenna 33, a power system 34, and a power coil 35 all mounted on a substrate 36. Sensor 31 may be any one of a number of known tire parameter sensors, such as the strain sensor disclosed in the above-referenced '490 application, a tire wall temperature sensor, an internal tire air temperature sensor, or the like. The MCU/transmitter 32 is preferably a commercially available Freescale type MC68HC908RF2 unit or the equivalent, having a transmitter section for generating r.f. information signals containing tire parameter measurement results, and a microcomputer for supervising and controlling the operation of the transmitter section and for sampling the sensor output signals and converting these sampled signals to measurement data to be supplied to the transmitter section. Antenna 33 may be a dipole antenna as shown, which is connected to the transmitter output to enable the transmission signals generated by the transmitter section to be radiated to an associated receiver unit (not shown) capable of converting the received signals into driver advisory signals in a known manner. Power system 34 and power coil 35 function to supply electrical power to the above-described system components.

Substrate 36 is preferably fabricated from a relatively thin, flexible dielectric material, such as PTFE, possessing good bonding characteristics for the system components 31-35 and capable of good adhesion to the outer or inner wall surface of a vehicle tire 27 or compatible with internal mounting within a tire side wall.

Power coil 35 is formed on the surface of substrate 36 from a metallic ohmic conductive material, such as copper, using conventional deposition techniques. The line width of each coil turn, the number of coil turns, and the coil area in the plane of substrate 36 are all a matter of design choice to those of ordinary skill in the art. The free ends of power coil 35 are electrically connected to the input terminals of power system 34 during fabrication using any suitable bonding technique.

Figure 4:
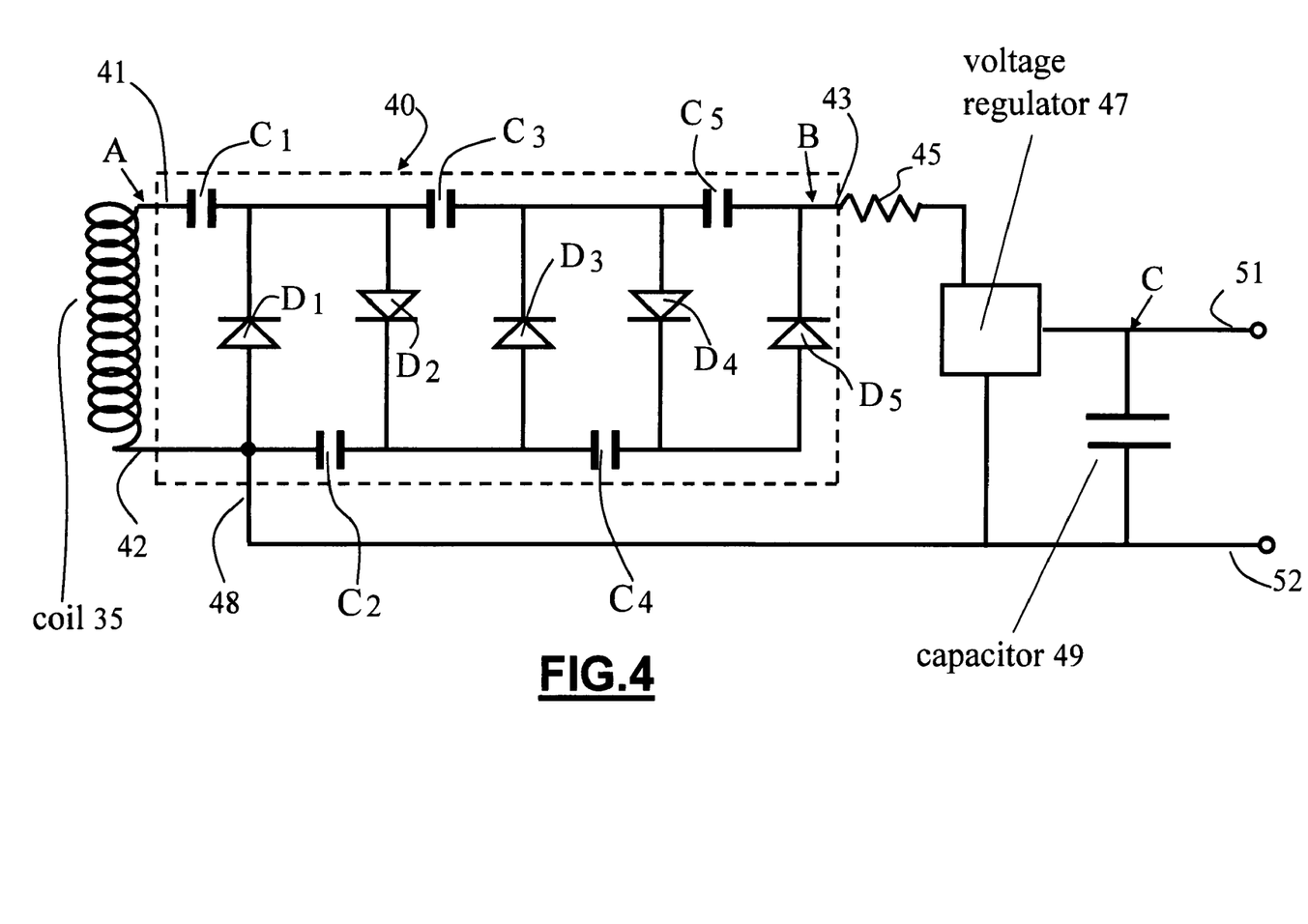
FIG. 4 is a circuit diagram of the power system portion of the sensor assembly of FIG. 3.

With reference to FIG. 4, power system 34 comprises a voltage multiplier section 40 having a pair of input terminals 41, 42 coupled respectively to opposite ends of power coil 35, a first output terminal 43 coupled via a resistor 45 to one input of a voltage regulator 47, and a second common output terminal 48 coupled to a common input terminal 48 of voltage regulator 47. Voltage multiplier section 40 is preferably a circuit configured as a Cockcroft-Walton voltage multiplier capable of increasing the magnitude of an input voltage present across the input terminals 41, 42 by a multiplicative factor whose value is primarily dependent upon the number of stages incorporated into the section, with each stage consisting of a capacitor $C_i$ and diode $D_i$ (where i is an integer ranging from 1 to n, n being the total number of stages). In the specific embodiment shown in FIG. 4, n=5.

Voltage regulator 47 may comprise any one of a number of known voltage regulator circuits capable of converting unregulated input voltages which vary over a relatively wide range to a relatively stable D.C. output voltage whose magnitude varies only slightly within the range required by MCU/transmitter 32 for reliable operation.

The operating voltage output of voltage regulator 47 is coupled to one plate of a storage capacitor 49. The other plate of storage capacitor 49 is coupled to common terminal 48 of the voltage multiplier circuit. Supply voltage output terminals 51, 52 are connected to the power input terminals of MCU/transmitter 32 in order to provide regulated D.C. voltage to this unit.

Figure 5:
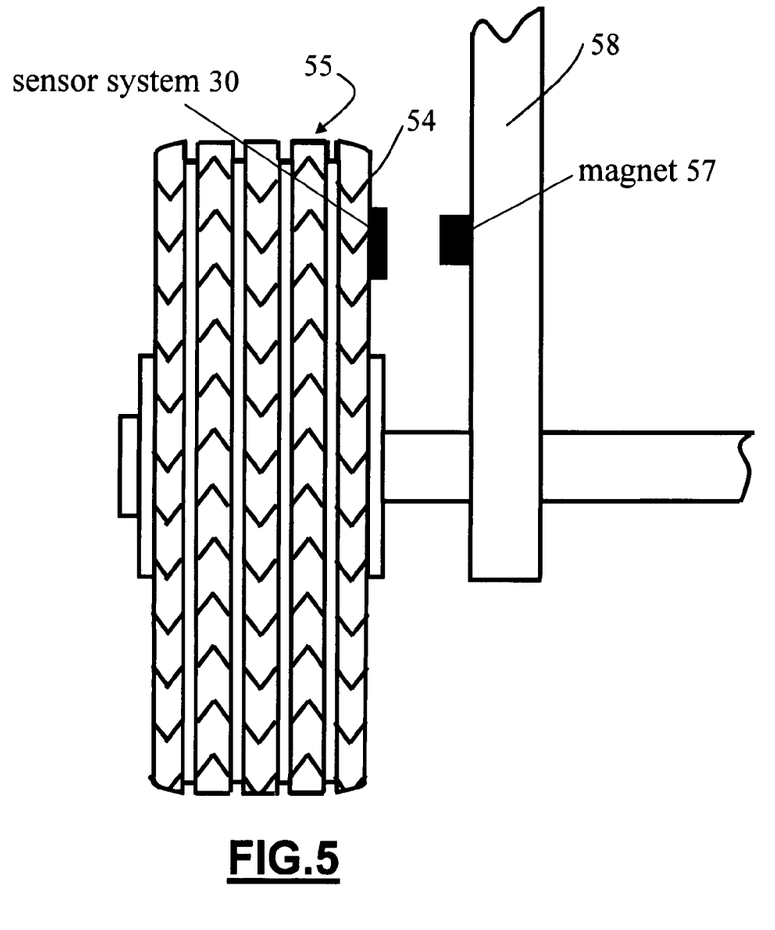
FIG. 5 is a side view partially in section showing a single tire pressure sensor assembly according to the invention mounted on the external side wall surface of a vehicle tire and the associated stationary magnet.

FIG. 5 is a side view partially in section showing a single tire pressure sensor assembly 30 according to the invention mounted on the external side wall surface 54 of a vehicle tire 55 and an associated stationary magnet 57. As seen in this FIG., a magnet 57 is secured to a stationary support member of the vehicle to which the tire 55 is rotatably mounted. Support member 58 may comprise any structural vehicle member which is positioned in reasonably close proximity to the side wall 54 of tire 55 and which enables magnet 57 to be mounted thereto in a position which ensures that the magnetic lines of force which emanate from magnet 57 will be cut by the turns of power coil 35 carried by sensor system 30 as tire 55 rotates about the axis of rotation. Thus, in operation, as tire 55 rotates, power coil 35 of sensor system 30 periodically passes through the magnetic force field generated by magnet 57, thereby inducing electrical current in power coil 35. A separation distance between magnet 57 and power coil 35 of about six inches has been found to be effective in causing sufficient voltage to be generated to reliably operate the system electronics. Closer separation distances will enable more energy to be transferred into the system.

Figure 6:
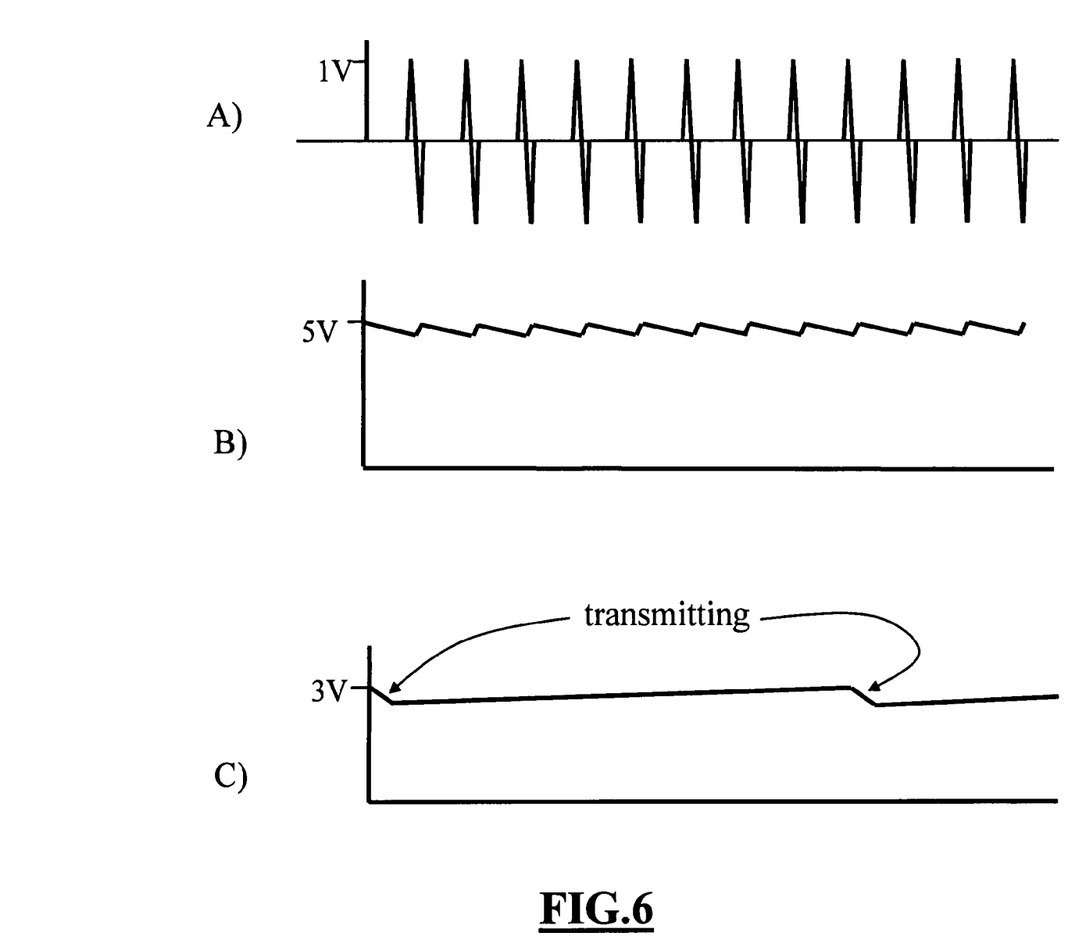
FIGS. 6A-C are a set of wave form diagrams illustrating the electrical power signals at various points of the power system portion of FIG. 4.

FIGS. 6A-C illustrate the voltages present at circuit points A, B, and C of FIG. 4 when tire 55 is rotated. As shown in FIG. 6A, the voltage developed in power coil 35 and presented at the input to voltage multiplier section 40 is a succession of sinusoidal waves, whose spacing is a function of the rotational speed of tire 55. As shown in FIG. 6B, the voltage present at the output of voltage multiplier stage 49 is an unregulated D.C. voltage whose minimum value is at least slightly higher than the minimum voltage required for the reliable operation of MCU/transmitter 32. In the preferred embodiment, this value is chosen as 5 VDC for an MCU/transmitter 32 having a nominal power input voltage of 3 VDC. As shown in FIG. 6C, the voltage present at the output of voltage regulator 47 is a relatively constant D.C. supply voltage whose magnitude ideally equals the optimum operating voltage specified for MCU/transmitter 32. In the preferred embodiment, this value is 3 VDC. As further shown in FIG. 6C, whenever the transmitter section of MCU/transmitter 32 is in the transmission mode of operation, there is a slight gradual decline in the magnitude of the supply voltage present at the output of voltage regulator 47 due to charge drain from storage capacitor 49.

For the system thus-far described according to the invention, the average power required for the MCU/transmitter 32 is about 5 microwatts when the transmitter is operated in the transmission mode for one millisecond at a rate of one transmission per minute. Consequently, the size of power coil 35 and substrate 36 may be relatively small-on the order of about 1½ inches by one inch. This results in a very light weight unit to be installed on or in the vehicle tire, which is highly desirable.

Figure 7:
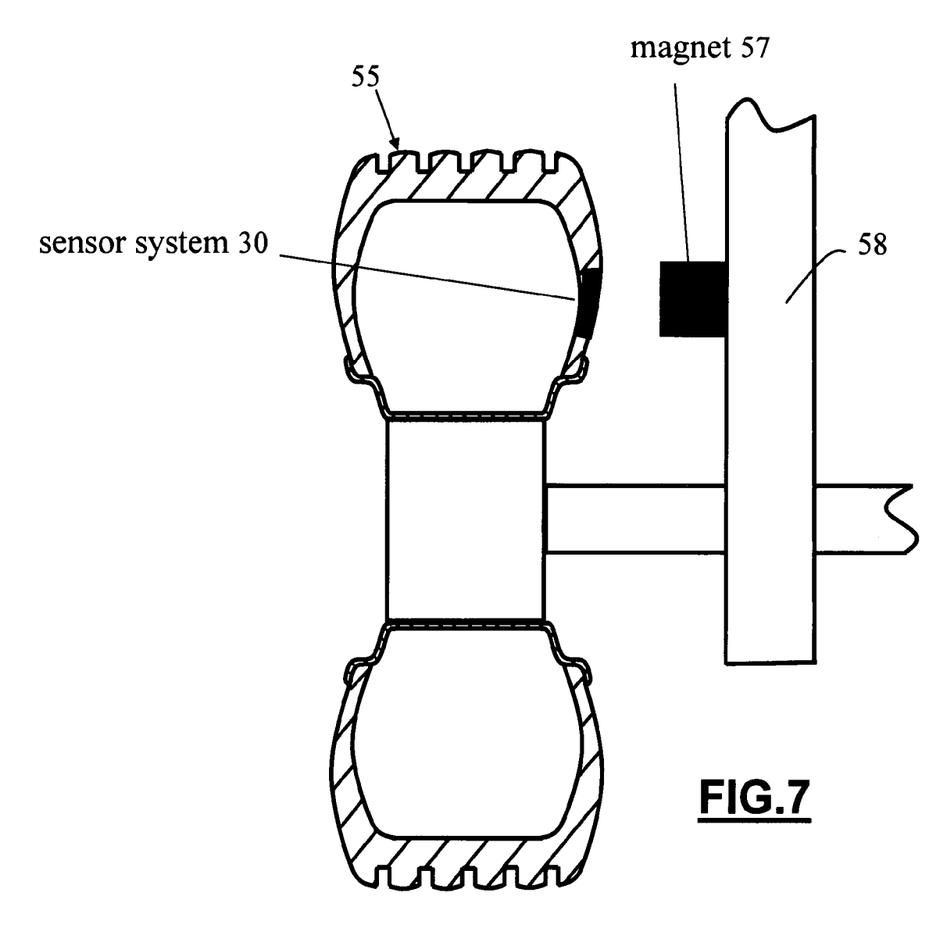
FIG. 7 is a side view partially in section showing a single tire parameter sensor assembly according to the invention mounted internally within the side wall of a vehicle tire and the associated stationary magnet.

FIG. 7 illustrates an alternate mounting arrangement for the invention. As seen in this FIG., the sensor assembly 30 is incorporated into the side wall structure of vehicle tire 55. This may be done during manufacture of the tire 55 using known fabrication techniques. In this alternate arrangement, stationary magnet 57 is secured to the vehicle stationary support member 58 in essentially the same manner as the FIG. 5 embodiment. The major advantage of the mounting arrangement of FIG. 7 lies in the elimination of any required bonding between the sensor assembly 30 and the tire side wall surface using an adhesive, which eliminates any tendency of the sensor assembly to separate from the tire side wall due to deterioration of the adhesive bond over time and in the presence of extreme ambient conditions (such as extreme ambient temperature changes, excessive moisture or dryness, etc.). It should be noted that the sensor assembly 30 may also be secured to the inside surface of the vehicle tire side wall, if desired.

Figure 8:
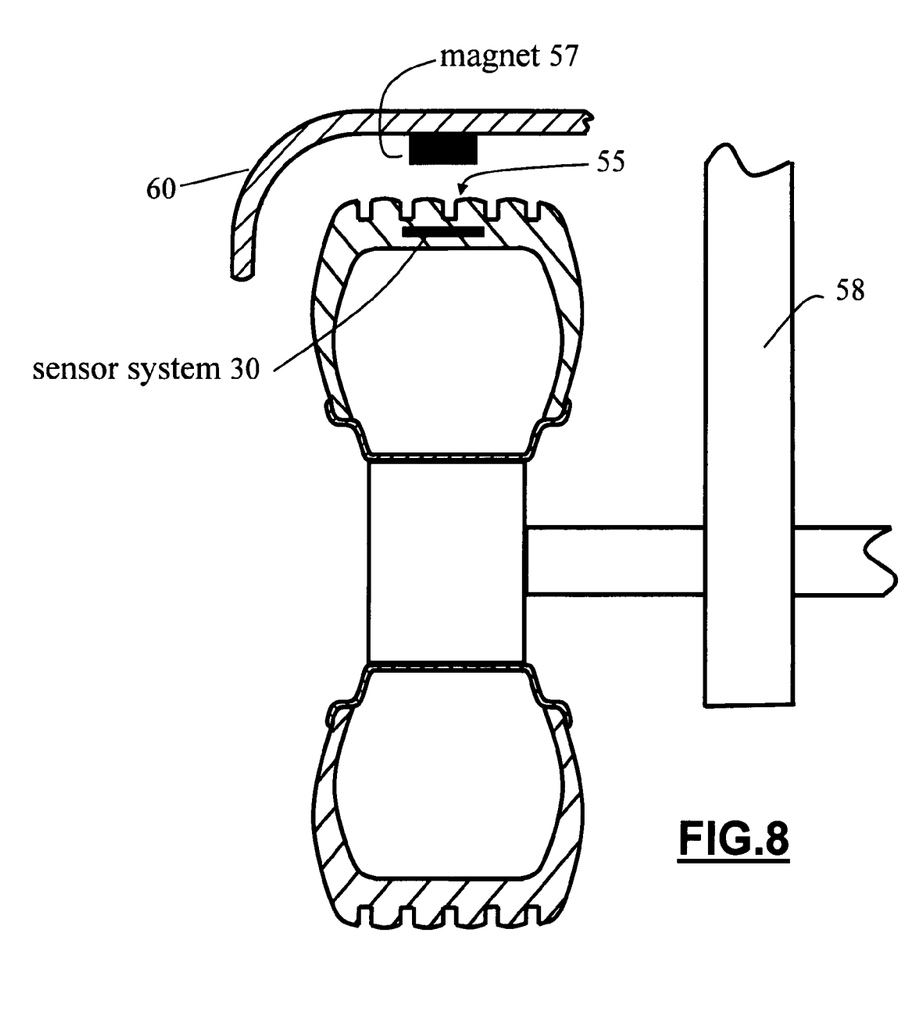
FIG. 8 is a side view partially in section showing a single tire parameter sensor assembly according to the invention mounted internally within the tread wall of a vehicle tire and the associated stationary magnet.

FIG. 8 illustrates still another alternate mounting arrangement for the invention. As seen in this FIG., the sensor assembly 30 is incorporated into the tread wall structure of vehicle tire 55. This may be done during manufacture of the tire 55 using known fabrication techniques. In this alternate arrangement, stationary magnet 57 is secured to a structural member 60 of the vehicle which overlies the vehicle tire 55. Structural member 60 may, for example, comprise the underside of the vehicle fender, a strut member used to strengthen the fender, an inner splash pan, or any structural member which has a portion facing the tire tread wall. This mounting arrangement may be preferred when the sensor 31 incorporated into the sensor assembly 30 provides the best sensor data when positioned centrally of the tread wall of tire 55.

While the invention has been thus-far described as a single unit for one tire, in practice each tire of a vehicle will be equipped with a tire parameter sensor assembly 30. In many applications of the invention, it may be desirable to equip each vehicle tire with more than one sensor assembly 30, such as a first sensor assembly 30 for monitoring internal tire pressure and a second sensor assembly 30 for monitoring tire wall temperature or some other parameter of interest. In such multiple sensor assembly installations, the mounting arrangements may be such that only a single magnet 57 may be required for providing the magnetic field necessary to induce electrical current in each sensor assembly power coil 35. For example, in a two sensor assembly application, both sensor assemblies may be molded into the tire side wall at different angular locations each centered on the same tire radius. In such an application, a single magnet 57 will suffice. In an application using one side wall mounted sensor assembly (as in FIG. 7) and one tread wall mounted sensor assembly (as in FIG. 8), two magnets 57 will be required.

As will now be apparent, the invention provides a simple, low cost tire parameter sensor system which is relatively simple in construction, easy to install, and which requires no battery to supply the electrical power required by the system electronics. As a consequence, the useful lifetime of the tire parameter sensor system is only limited by the useful lifetime of the vehicle tire and the system electronics. In addition, the weight of the system is substantially less than that of tire parameter sensor systems which use a battery to supply the electrical power required to operate the system electronics. In addition, the tire parameter sensor system according to the invention can accommodate various modes of installation, such as being incorporated into the tire during manufacture, installed on the inside wall of the tire before mounting on the wheel, and installed on the outer side wall of the tire after mounting on the wheel.

While the invention has been described with reference to particular preferred embodiments, various modifications, alternate embodiments, and equivalents may be employed, as desired. Therefore, the above should not be construed as limiting the invention, which is defined by the appended claims.

What is claimed is:

1. A tire parameter sensor assembly for monitoring a parameter of a vehicle tire, said assembly comprising:
   a substrate;
   a power system carried by said substrate for converting an unregulated input voltage to a regulated output voltage, said power system having an input terminal, an output terminal, a voltage multiplier circuit having said power system input terminal and an output, a voltage regulator having an input coupled to said output of said voltage multiplier circuit and an output, and a storage capacitor coupled to said output of said voltage regulator;
   a tire parameter sensor carried by said substrate for providing monitoring signals representative of the value of said parameter;
   a processor/transmitter unit carried by said substrate and coupled to said sensor for converting said monitoring signals to transmission signals, said processor/transmitter unit having a power input terminal coupled to said output terminal of said power system; and
   a power coil carried by said substrate and coupled to said input terminal of said power system,
   whereby said power coil develops said unregulated input voltage whenever a magnetic field is encountered by said coil and said power system produces said regulated output voltage to render said processor/transmitter operable.

2. The invention of claim 1 wherein said power coil is located on said substrate in a position surrounding said power system, said tire parameter sensor and said processor/transmitter.

3. The invention of claim 1 wherein said voltage multiplier circuit is a Cockcroft-Walton voltage multiplier circuit.

4. The invention of claim 1 wherein said power system is provided with first and second input terminals; and wherein said power coil is provided with a pair of terminals each connected to a different one of said first and second input terminals of said power system.

5. The invention of claim 1 further including a tire rotatably mounted on a vehicle; and wherein said tire parameter sensor assembly is mounted on said tire for rotation therewith.

6. The invention of claim 5 wherein said tire has a side wall; and wherein said tire parameter sensor assembly is mounted on said side wall of said tire.

7. The invention of claim 6 wherein said tire side wall has an inner surface; and wherein said tire parameter sensor assembly is mounted on said inner surface of said side wall of said tire.

8. The invention of claim 6 wherein said tire side wall has an outer surface; and wherein said tire parameter sensor assembly is mounted on said outer surface of said side wall of said tire.

9. The invention of claim 5 wherein said tire has a side wall; and wherein said tire parameter sensor assembly is mounted within said side wall of said tire.

10. The invention of claim 5 wherein said tire has a tread wall; and wherein said tire parameter sensor assembly is mounted within said tread wall of said tire.

11. The invention of claim 5 further including a magnet mounted on the vehicle in a location wherein the magnetic field lines generated by said magnet are encountered by said power coil as said tire rotates.

12. A vehicle mounted tire parameter sensor system for monitoring a parameter of a vehicle tire, said system comprising:
- a vehicle having a tire rotatably mounted thereon, and a support member;
- a magnet mounted on said support member for generating a magnetic field having force lines extending from said support member in the direction of said tire; and
- a tire parameter sensor assembly for monitoring said parameter, said assembly comprising a substrate; a power system carried by said substrate for converting an unregulated input voltage to a regulated output voltage, said power system having an input terminal, an output terminal, a voltage multiplier circuit having said power system input terminal and an output, a voltage regulator having an input coupled to said output of said voltage multiplier circuit and an output, and a storage capacitor coupled to said output of said voltage regulator and an output terminal; a tire parameter sensor carried by said substrate for providing monitoring signals representative of the value of said parameter; a processor/transmitter unit carried by said substrate and coupled to said sensor for converting said monitoring signals to transmission signals, said processor/transmitter unit having a power input terminal coupled to said output terminal of said power system; and a power coil carried by said substrate and coupled to said input terminal of said power system,
- said tire parameter sensor assembly being mounted on said tire in a position whereby said power coil encounters said magnetic field when said tire rotates and develops said unregulated input voltage so that said power system produces said regulated output voltage to render said processor/transmitter operable.

13. The invention of claim 12 wherein said power coil is located on said substrate in a position surrounding said power system, said tire parameter sensor and said processor/transmitter.

14. The invention of claim 12 wherein said voltage multiplier circuit is a Cockcroft-Walton voltage multiplier circuit.

15. The invention of claim 12 wherein said tire has a side wall; and wherein said tire parameter sensor assembly is mounted on said side wall of said tire.

16. The invention of claim 15 wherein said tire side wall has an inner surface; and wherein said tire parameter sensor assembly is mounted on said inner surface of said side wall of said tire.

17. The invention of claim 15 wherein said tire side wall has an outer surface; and wherein said tire parameter sensor assembly is mounted on said outer surface of said side wall of said tire.

18. The invention of claim 12 wherein said tire has a side wall; and wherein said tire parameter sensor assembly is mounted within said side wall of said tire.

19. The invention of claim 12 wherein said tire has a tread wall; and wherein said tire parameter sensor assembly is mounted within said tread wall of said tire.

20. The invention of claim 12 wherein said vehicle includes a plurality of tires rotatably mounted thereon, and a plurality of support members; and further including a corresponding plurality of tire parameter sensor assemblies for monitoring said parameter, each of said tire parameter sensor assemblies comprising a substrate; a power system carried by said substrate for converting an unregulated input voltage to a regulated output voltage, said power system having an input terminal and an output terminal; a tire parameter sensor carried by said substrate for providing monitoring signals representative of the value of said parameter; a processor/transmitter unit carried by said substrate and coupled to said sensor for converting said monitoring signals to transmission signals, said processor/transmitter unit having a power input terminal coupled to said output terminal of said power system; and a power coil carried by said substrate and coupled to said input terminal of said power system,
- each of said tire parameter sensor assemblies being mounted on an associated one of said plurality of tires in a position whereby each said power coil encounters the magnetic field generated by the associated magnet when the associated one of said tires rotates and develops said unregulated input voltage so that said power system produces said regulated output voltage to render said processor/transmitter operable.

21. The invention of claim 12 further including a second tire parameter sensor assembly for monitoring a second parameter of the vehicle tire, said second tire parameter sensor assembly comprising a second substrate; a second power system carried by said second substrate for converting an unregulated input voltage to a regulated output voltage, said second power system having an input terminal and an output terminal; a second tire parameter sensor carried by said second substrate for providing monitoring signals representative of the value of said second parameter; a second processor/transmitter unit carried by said second substrate and coupled to said second sensor for converting said monitoring signals to transmission signals, said second processor/transmitter unit having a power input terminal coupled to said output terminal of said second power system; and a second power coil carried by said second substrate and coupled to said input terminal of said second power system,
- said second tire parameter sensor assembly being mounted on said tire in a second position whereby said second power coil encounters said magnetic field when said tire rotates and develops said unregulated input voltage so that said second power system produces said regulated output voltage to render said second processor/transmitter operable.

22. A vehicle mounted tire parameter sensor system for monitoring a first and a second parameter of a vehicle tire, said system comprising:
- a vehicle having a tire rotatably mounted thereon, and a support member;
- a magnet mounted on said support member for generating a magnetic field having force lines extending from said support member in the direction of said tire; and
- a first tire parameter sensor assembly for monitoring said first parameter, said first tire parameter sensor assembly comprising a first substrate; a first power system carried by said substrate for converting an unregulated input voltage to a regulated output voltage, said first power system having an input terminal and an output terminal; a first tire parameter sensor carried by said first substrate for providing monitoring signals representative of the value of said first parameter; a first processor/transmitter unit carried by said first substrate and coupled to said first sensor for converting said monitoring signals to transmission signals, said first processor/transmitter unit having a power input terminal coupled to said output terminal of said first power system; and a power coil carried by said substrate and coupled to said input terminal of said first power system, said first tire parameter sensor assembly being mounted on said tire in a position whereby said power coil encounters said magnetic field when said tire rotates and develops said unregulated input voltage so that said first power system produces said regulated output voltage to render said first processor/transmitter operable; and a second tire parameter sensor assembly for monitoring a second parameter of the vehicle tire, said second tire parameter sensor assembly comprising a second substrate; a second power system carried by said second substrate for converting an unregulated input voltage to a regulated output voltage, said second power system having an input terminal and an output terminal; a second tire parameter sensor carried by said second substrate for providing monitoring signals representative of the value of said second parameter; a second processor/transmitter unit carried by said second substrate and coupled to said second sensor for converting said monitoring signals to transmission signals, said second processor/transmitter unit having a power input terminal coupled to said output terminal of said second power system; and a second power coil carried by said second substrate and coupled to said input terminal of said second power system, said second tire parameter sensor assembly being mounted on said tire in a second position whereby said second power coil encounters said magnetic field when said tire rotates and develops said unregulated input voltage so that said second power system produces said regulated output voltage to render said second processor/transmitter operable.

23. The invention of claim 22 further including a tire rotatably mounted on a vehicle; and wherein said first and second tire parameter sensor assemblies are mounted on said tire for rotation therewith.

* * * * *